US011440387B1

(12) United States Patent
Younkins, Jr. et al.

(10) Patent No.: US 11,440,387 B1
(45) Date of Patent: Sep. 13, 2022

(54) TRUCK CAMPER SHELL SYSTEM

(71) Applicants: John Howard Younkins, Jr., Roswell, GA (US); Amy Morrill Younkins, Roswell, GA (US)

(72) Inventors: John Howard Younkins, Jr., Roswell, GA (US); Amy Morrill Younkins, Roswell, GA (US)

( * ) Notice: Subject to any disclaimer, the term of this patent is extended or adjusted under 35 U.S.C. 154(b) by 0 days.

(21) Appl. No.: 17/166,859

(22) Filed: Feb. 3, 2021

Related U.S. Application Data

(60) Provisional application No. 62/995,564, filed on Feb. 4, 2020.

(51) Int. Cl.
*B60J 7/16* (2006.01)
*B60P 3/34* (2006.01)

(52) U.S. Cl.
CPC .............. *B60J 7/1621* (2013.01); *B60P 3/34* (2013.01)

(58) Field of Classification Search
CPC ........................................................ B60P 3/34
USPC ............................... 296/164, 165, 29.06, 167
See application file for complete search history.

(56) References Cited

U.S. PATENT DOCUMENTS 3,536,352 A * 10/1970 Beckley .................... B60P 3/34
296/167
4,139,229 A * 2/1979 Cooper .................... B60P 3/34
296/165
6,471,280 B1 * 10/2002 Fowler ....................... B60J 7/10
280/756

OTHER PUBLICATIONS

"The Nomad Camper Package." *TopperLift* Downloaded from https://topperzlift.com/index.php/product/the-nomad-camper-package/. Downloaded on Mar. 16, 2021. pp. 1-3.
"Project M Camper." *Four Wheel Campers*. Downloaded from https://fourwheelcampers.com/model/project-m/. Downloaded on Mar. 16, 2021, pp. 1-12.
Screenshots from Down2Mob Overland channel, "Why Brian chooses to live in a 5 foot bed Tacoma—Camper Slide Explained," dated Apr. 1, 2019. Retrieved from https://www.youtube.com/watch?v=dUywbMk57cE on Mar. 17, 2021. From 1:03 to 9:10.

* cited by examiner

*Primary Examiner* — Joseph D. Pape
(74) *Attorney, Agent, or Firm* — Eric W. Cernyar; Huffman Law Group, PC

(57) ABSTRACT

A camper shell system for a pickup truck generally includes universal mounting plates and a structural support for a camper shell that comprises front, first, and second walls that extend downward from a top. The shell and mounting plates extend wider than the bed rails to cover a space above and to the sides of the truck bed. The structural support is sized to nest within and reinforce the camper shell and, preferably, to transfer forces acting on the camper shell to the bed of the truck. In one configuration, when the tailgate is down, the structural support is enclosed and operable to extend over the tailgate to enlarge the space covered by the camper shell system and to help bear the top of the camper shell.

20 Claims, 5 Drawing Sheets

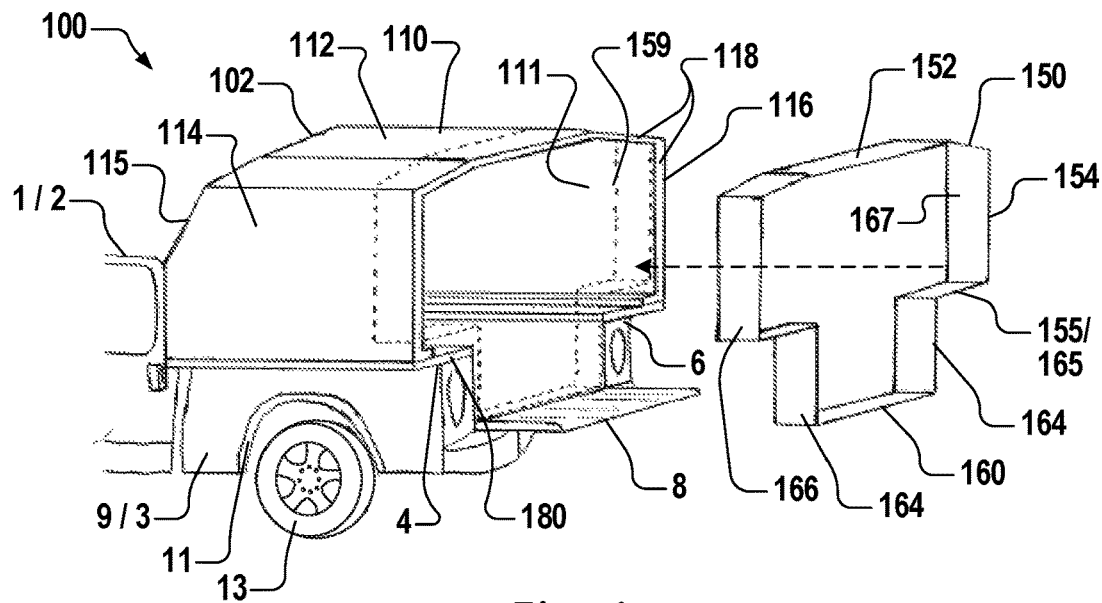
Fig. 1
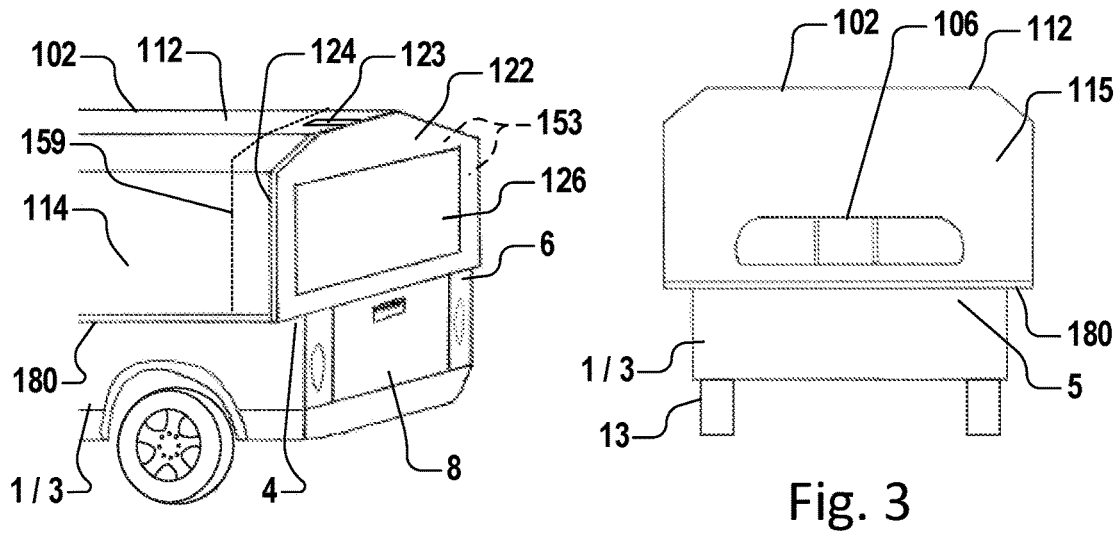
Fig. 2
Fig. 3
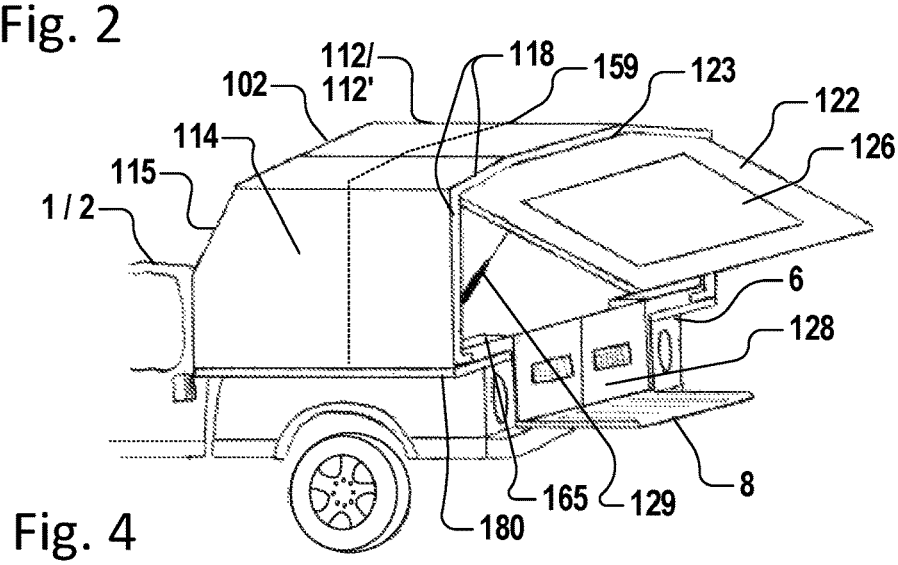
Fig. 4

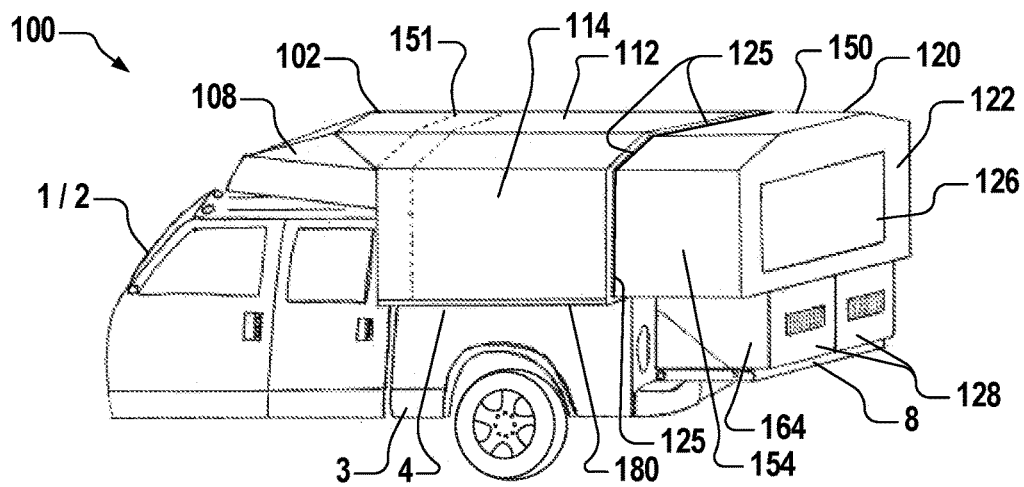
Fig. 5
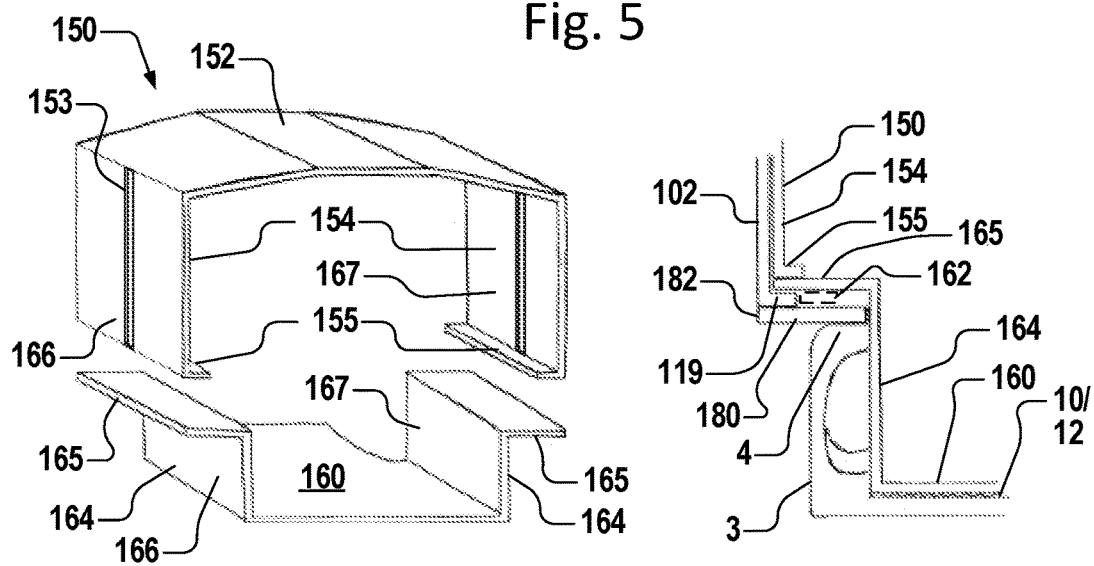
Fig. 6
Fig. 7
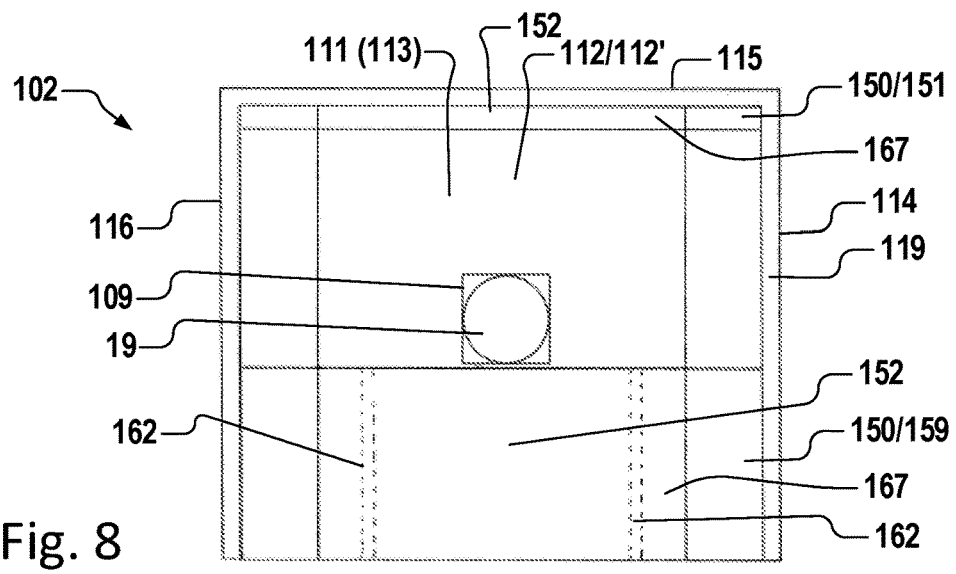
Fig. 8

TRUCK CAMPER SHELL SYSTEM

RELATED APPLICATIONS

This application claims the benefit of my U.S. provisional patent application Ser. No. 62/995,564 filed Feb. 4, 2020, entitled "Truck Camper Shell Sleeve," which is herein incorporated by reference and referred to herein as "the provisional application."

TECHNICAL FIELD

The present disclosure generally relates to truck shell systems and assemblies, and more particularly relates to systems and assemblies for supporting and expanding a truck shell.

BACKGROUND

Camper shells are commonly employed as small housings to cover the backs of pickup trucks. Many materials are utilized, from fabrics to fiberglass and aluminum, and the products go by various names, including truck or bed cap, truck topper, or shell. The end use of the camper shell is not limited to camping, but also includes utility and storage, protecting the contents from theft and weather.

Manufacturers and users are always on the lookout for new ways to make the interior space more useful and to accessorize the entire unit.

Accordingly, there is need in the art for a camper shell that maximizes covered space on a truck bed, and does so efficiently and safely.

SUMMARY

In one embodiment, a camper shell system or kit for a truck having a bed with side rails and a tailgate generally includes one or more mounting plates and a camper shell. The mounting plates are sized to be positioned horizontally atop the length of a first bed side rail and a second side bed rail. The camper shell is sized to rest on the one or more mounting plates. The mounting plate(s) are configured to be secured to the inside of the first and second side bed rails and to extend wider than the first and second side bed rails. The camper shell comprises a top having a crown that tapers down from a midsection, a first wall that extends downward from the top, a second wall that extends downward from the top, a front wall that extends downward from the top, and a rear portal defined by the edges of the top and first and second walls above the truck's tailgate. The first and second walls of the camper shell extend wider than the first and second side bed rails, respectively, and at least the first and second walls of the camper shell join to the mounting plate(s) to cover a space above and to the sides of the truck bed.

The mounting plate(s) may be structured to extend beyond the first and second side bed rails both outside of the truck and within the bed and to be cut lengthwise to fit a variety of truck bed widths. The mounting plate(s) and camper shell may also comprise profiles that interlock to aid attachment or reduce incursion of fluids into the truck bed.

The camper shell system may further comprise a structural support (having a crown that tapers down from a midsection) sized to nest within the camper shell and reinforce the first wall, top, and second wall. The structural support may further comprise a first leg and a second leg that extend from proximate the first and second side bed rails, respectively, downward within the space of the bed to join a base at the floor of the bed to transfer forces acting on the camper shell to the bed of the truck.

In one configuration, when the tailgate is down, the structural support is operable to extend over the tailgate to enlarge the space covered by the camper shell system and to help bear the top of the camper shell. The camper shell and structural support comprise one or more rigid materials that flex. A liner may be located between the structural support and the camper shell.

The structural support may be located near the cab or the truck or proximate the rear portal, and may have a frame or structural profiles that make the structural support more rigid.

In an alternate embodiment, an extendable shell system for a truck having a bed with side rails and a tailgate, or a kit for forming the same, generally includes a camper shell and a structural support. The camper shell comprises a top having a crown that tapers down from a midsection, a first wall that extends downward from the top, a second wall that extends downward from the top, a front wall that extends downward from the top, and a rear portal defined by the edges of the top and first and second walls above the truck's tailgate. The structural support is sized to nest within the camper shell and reinforce the first wall, top, and second wall, and further comprises a first leg and a second leg that extend from proximate the first and second side bed rails, respectively, downward within the space of the bed to join a base at the floor of the bed to transfer forces acting on the camper shell to the bed of the truck.

The first and second walls of the camper shell extend wider than, and join to, the first and second side bed rails, respectively, to cover a space above and to the sides of the truck bed. When the tailgate is down, the structural support is operable to extend over the tailgate to enlarge the space covered by the camper shell system and to help bear the top of the camper shell. The camper shell may extend above the cab of the truck.

The camper shell and structural support comprise one or more rigid materials that flex. A liner may be located between the structural support and the camper shell.

Other systems, devices, methods, features, and advantages of the disclosed product and methods for forming a camper shell system for a truck will be apparent or will become apparent to one with skill in the art upon examination of the following figures and detailed description. All such additional systems, devices, methods, features, and advantages are intended to be included within the description and to be protected by the accompanying claims.

BRIEF DESCRIPTION OF THE DRAWINGS

The present disclosure may be better understood with reference to the following figures. Corresponding reference numerals designate corresponding parts throughout the figures, and components in the figures are not necessarily to scale.

It will be appreciated that the drawings are provided for illustrative purposes and that the invention is not limited to the illustrated embodiment. For clarity and in order to emphasize certain features, not all of the drawings depict all of the features that might be included with the depicted embodiment. The invention also encompasses embodiments that combine features illustrated in multiple different drawings; embodiments that omit, modify, or replace some of the features depicted; and embodiments that include features not illustrated in the drawings. Therefore, it should be understood that there is no restrictive one-to-one correspondence between any given embodiment of the invention and any of the drawings.

FIG. 1 illustrates a truck camper shell system having a structural support.

FIG. 2 illustrates the camper shell of FIG. 1 having a rear hatch.

FIG. 3 is a front view of a camper shell on a truck bed.

FIG. 4 illustrates the camper shell of FIG. 1 having a rear window and doors on a structural support in retracted position.

FIG. 5 illustrates a structural support with window and doors extended over a tailgate to enlarge the covered space of the truck camper shell system.

FIG. 6 is a perspective view of a structural support.

FIG. 7 illustrates the fit of a camper shell to a truck's bed rail.

FIG. 8 is a bottom view of a camper shell having two structural supports.

DETAILED DESCRIPTION

Figure 9:
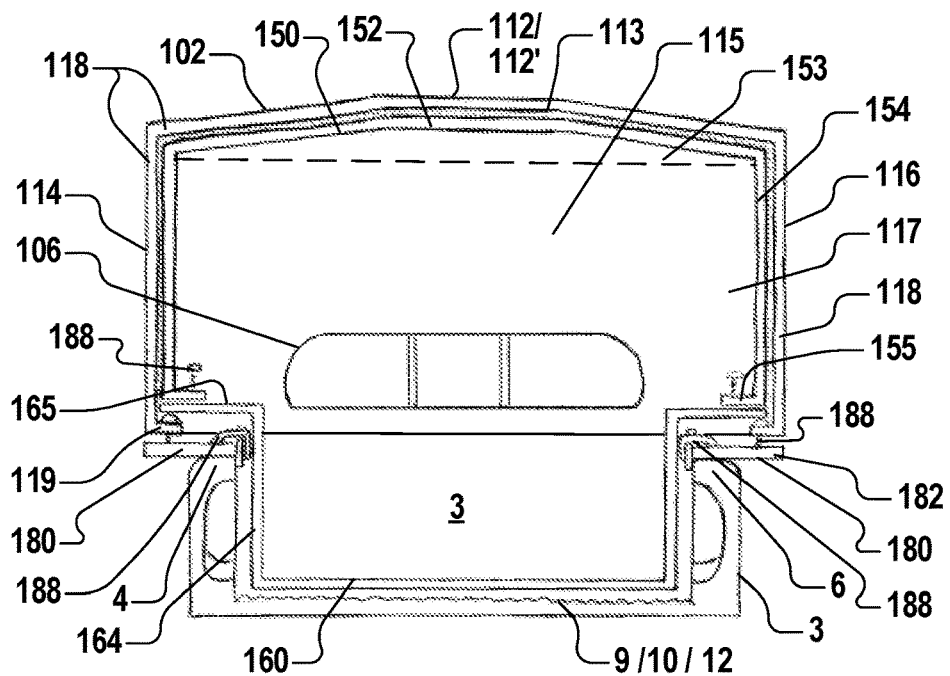
FIG. 9 illustrates a rear view of a camper shell and a structural support on a truck bed.

Specific quantities such as spatial dimensions may be used explicitly or implicitly herein and are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

In describing preferred and alternate embodiments of the technology described herein, specific terminology is employed for the sake of clarity. Technology described herein, however, is not intended to be limited to the specific terminology so selected, and it is to be understood that each specific element includes all technical equivalents that operate in a similar manner to accomplish similar functions.

Furthermore, although there may be references to "advantages" provided by some embodiments, other embodiments may not include those same advantages, or may include different advantages. Any advantages described herein are not to be construed as limiting to any of the claims.

Described below are embodiments of a truck camper shell system, including related apparatuses, assemblies, kits, and methods of manufacture and use.

The same truck part may be called different names. For ease of discussion, we will generally refer to a pickup truck 1 as having four parts, including the chassis, front end (engine area), cab 2, and bed 9. Bed walls have integral reinforced tops called bed rails that typically support the truck camper shell, and the terms bed walls and bed rails may be used interchangeably unless specified. These integral bed rails are not to be confused with accessories sometimes called "rails." The front wall/rail may be called a bulkhead. The bed also has a floor and a tailgate. Many of these parts may be protected by a bed liner, but the bed liner is only illustrated when directly relevant; in other words, for example, language stating that a camper shell rests on a bed rail implies that the camper shell may rest on a bed liner that rests on the bed rail. Of course, the truck has wheels 13.

Figures of the present Application tend to describe views in terms of truck nomenclature. For example, the front wall/rail is expected to be in the front, and the tailgate in the rear. Likewise, truck beds have a length, front to back, as does the tailgate. The bed, its walls, side bed rails, and tailgate have widths side-to-side. Thus, the truck camper shell system is presented in those dimensions.

As described in FIGS. 1-17, a truck camper shell system 100 generally comprises a truck camper shell 102, a structural support 150, and one or more mounting plates 180 that hold the camper shell 102. In some instances, the truck 1 may be part of the system 100. As shown in FIGS. 1-4, the camper shell 102 has a top 112 with a crown 112' that tapers or curves down from a midline or a flat midsection. The crown 112' may be prominent or relatively inconspicuous. A flat midsection is helpful for mounting a fan 19, and a wide, flat crown 112' as in FIG. 3 is beneficial for carrying gear, supplies, and equipment. The camper shell 102 also has a first wall 114, a front wall 115, and a second wall 116 that extend downward from the top 112 and, in one embodiment, turn inward to form a bottom lip 119 (FIG. 9) to form a perimeter around the bottom of the camper shell 102. Rear edges 118 of the first wall 114, top 112, and second wall 116 define a large opening or portal 117 that is located over the closed tailgate 8 when the camper shell 102 rests on the bed walls 3. Also shown in the front view of FIG. 3 is the front wall 115 resting upon a mounting plate 180 atop the front bedrail 5. In practice, the camper shell 102 is joined to a mounting plate 180 above at least the first bed rail 4 and the second bed rail 6, and the bed rails 4, 6 in turn secured to the mounting plate 180, which will be discussed in more detail later.

Structural support 150 is an inner shell that usually mimics the shape of the portion of the camper shell 102 into which it will be inserted, so the structural support 150 nests snugly in place to reinforce at least the top 112, and the first and second walls 114, 116 as well, to prevent bowing of the oversized camper shell 102 with a heavy load packed atop it. The shapes of the camper shell 102 and structural support 150 are not limited to the forms shown, but will vary with design choices that consider cost, roof width, maximum interior space, drainage, aerodynamics, weight capacity, and aesthetics, among other factors. When inserted into a rearward position 159 (indicated by dashed lines) near the tailgate 8, the structural support 150 bears the top 112 and provides stability around the portal 117. When a stationary structural support 150 is secured in place, as in FIG. 2, a roof hinge 123 may be used to attach a hatch 122 that closes and seals around the rear edges 118 of the camper shell walls 114, 112, 116, as evidenced by the visible hatch edges 124. On the other hand, when a slidable structural support 150 is utilized as in FIG. 4, the hatch 122 is secured directly to the structural support 150 with a hinge 123 and piston or window lift 129 and closes within the rear edges 118 of the camper shell walls 114, 112, 116.

The hatch 122 typically has a rear window 126. Support of a hatch 122 or window 126 by structural support 150 is an improvement over existing rear window designs that either create a structural weakness or minimize the portal opening. In configurations wherein the camper shell walls 114, 112, 116 turn laterally inward at the rear to comprise flanges 153 (illustrated by dashed labeling in FIG. 2) that frame parts of the window 126 similar to the outer perimeter of the hatch 122, the flange edges are the rear edges 118 of the camper shell walls 114, 112, 116 that define the portal 117 over the tailgate 8. In other words, camper shell walls 114, 112, 116 that turn inward to form the portal 117 do not form a fifth or rear wall of the camper shell 102. One or more doors 128, which may comprise but are not limited to screened slider panels, are often located on the structural support 150 behind the tailgate 8. A slidable structural support 150 usually has more length (back to front) than a stationary support 150, as explained next.

FIG. 5 illustrates a larger camper shell 102 having a portion 108 that extends over the cab 2 and a narrow structural support 150 at a forward position 151 (dashed lines) to support the large structure at the cab 2; in this application, the structural support 150 may be frame-like and support a sleeping surface near the cab 2 or comprise stiffer materials that reach roll bar strength. At the rear end of the camper shell 102, a second structural support 150 forms a casing for an extension, sleeve, insert, or extendable unit 120 that, when the tailgate 8 is down, is operable to slide out and over the open tailgate 8. As shown, the extendable unit 120 may extend beyond the length of the open tailgate 8 depending upon design. With rear hatch 122 and window 126, doors 128, and weatherizing material 125, the extendable unit 120 greatly increases the interior space covered by the camper shell system 100. The truck 1 may be driven with the extendable unit 120 secured in this configuration. In a preferred embodiment, the extendable unit 120 may retract about three feet into the camper shell 102 so the tailgate 8 will close, although insertion or retraction is not limited to three feet. One of skill in the art will understand that weatherizing material 125 is appropriate at any gaps between parts that form an enclosed space. This extended configuration is excellent for many purposes; for example, a family can camp together, a worker can haul gear into remote areas and stay a day or two, or a contractor can haul 4'×8' sheet materials without concern for the weather. For utility applications the camper shell system 100 is a lighter weight, more cost-efficient option.

FIGS. 6-12 describe in more detail the fit between the camper shell 102 and structural support 150, as well as options for configuration. In general, the structural support 150 may be formed as one piece, as two sections that are joined, or as an assembly of numerous components. As illustrated in FIGS. 6-7, basic components include a crown 152 that tapers down from a midsection (similar to the shell top 112), arms 154 that extend downward from the crown 152 to lips 155 that turn laterally inward. For stationary use, the structural support 150 may require only those parts, such that any forces acting on the shell top 112 transfer to the bed rails 4, 6. To carry support of the top 112 to the bed floor 10, further basic components include a threshold or base 160 at the floor of the bed, legs 164 that extend upward from the base 160, and lateral flanges 165 on the leg that turn outward to meet the lips 155 reaching down from the crown 152. In this configuration, forces acting on the shell top 112 transfer to the bed floor 10, allowing use of thinner and lighter materials that are rigid, but could flex, for manufacturing a large camper shell 102. A structural profile 153 that is a rib or corrugation is shown on arms 154 for increased bearing strength. Other parts described herein, anywhere in the camper shell system 100, may employ structural profiles comprising braces, ribs, corrugations, flanges, protrusions, or recesses, or a combination thereof. A preferred embodiment is symmetrical, but one of skill in the art will understand that symmetry is not required.

In FIG. 7, mounting plate 180 is located on a bed rail 4 and joined to bottom lip 119 of shell 102. Alternatively, the camper shell 102 and mounting plate 180 may be formed as one piece, with the mounting plate 180 becoming the bottom lip 119. A structural support 150 having a lateral flange 165 above the mounting plate 180 supports arm 154 that leads to crown 152. An optional roller or slide assembly 162 is located between the mounting plate and lateral flange 165 to ease sliding of an extendable unit 120, if necessary. The lateral flange 165 joins leg 164 that in turn joins the base 160 on the floor bed 10 and bed liner 12.

FIG. 8 is a bottom (inside) view of the camper shell 102 with two structural supports 150. Only their crowns 152 are illustrated, with lower portions not shown. A bottom lip 119 about the perimeter of the camper shell walls 114, 115, 116 frames the figure. A narrow structural support 150 is in a forward position 151. A sizeable structural support 150 is in a rearward position 159 to give support about the portal 117 and/or to extend out of the camper shell 102. Although structural support is preferred, one of skill in the art will understand that the parts may be configured to utilize the novel mounting plates 180 and extendable unit 120 without concern for supporting the camper shell 102 if it is stable alone. The inner surface 111 of the camper shell 102 typically comprises a liner 113 against which at least the crown 152 of the extendable unit 120 will nest. A fibrous material like carpet is an excellent liner 113 that reduces sliding friction, damage to moving parts, provides insulation, and is useful for attaching gear with Velcro®, among other benefits, although the liner is not limited to carpet. Also shown is a fan mount aperture 109, a fan 19, and optional roller or slide assembly 162 placed atop the crown 152 to ease extension of the rearward crown 152.

FIG. 9 is a rear view of the camper shell 102 positioned on the truck 1 with a structural support 150 nested in place. Liner 113 resides on the inside of the camper shell 102 and separates the camper shell 102 from the structural support 150. An optional brace that is a structural profile 153 originates at the crown 152 and descends to the dashed line to act as a header, for example. Similar bracing flanges may descend along the arms 154 to frame an opening for a large rear window 126 that would hinge on the brace 153 and replace use of a hatch 122. In the background, front window 106 is positioned in front wall 115 over bulkhead 3. For illustrative purposes only, spacing between parts is shown in the corners above the mounting plates 180 to accentuate a few possible ways to join the parts, including fasteners 188 like screws, bolts, and clamps. Adequate spacing is envisioned for the assembled parts to clear any fasteners 188, including the clamps, when the structural support 150 slides to extend. Joining of parts is not limited to mechanical fasteners 188, but may include various types of bonding and other methods.

Figure 10:
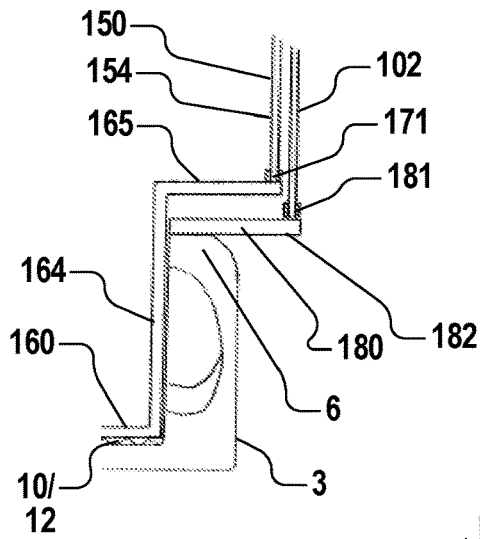
FIG. 10 illustrates the fit of a camper shell to a truck's bed rail.
Figure 11:
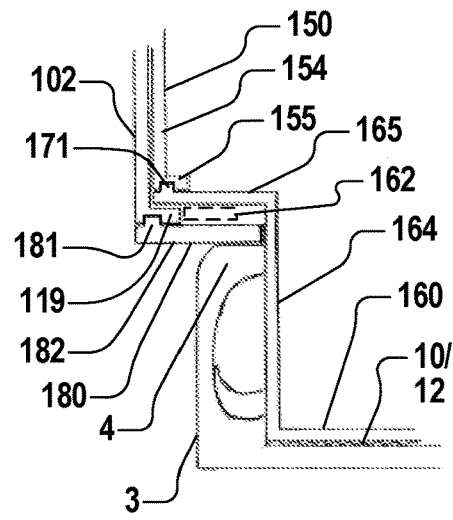
FIG. 11 illustrates the fit of a camper shell to a truck's bed rail.
Figure 12:
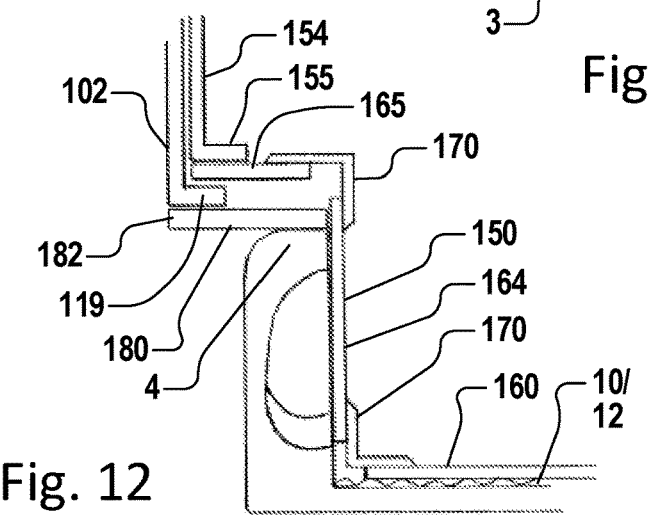
FIG. 12 illustrates the fit of a camper shell and adjustable structural support.

Of particular note is the wide portion 182 of the mounting plate 180 that extends outside of the truck 1 beyond each of the first and second bed rails 4, 6 to enlarge the space covered by the camper shell system 100. FIGS. 10-12 detail various options for forming these corner areas. FIG. 10 illustrates the mounting plate 180 with an interlocking profile 181 that accepts a camper shell 102 formed without a bottom lip 119 in order to aid nestable stacking for storage and shipping. These are large parts, and such stacking is a tremendous benefit. Flange 165 has a similar interlocking profile 171 to accept an arm 154. FIG. 11 features different interlocking profiles 171, 181 in that same area that utilize protrusions and recesses to help align and secure the parts and resist incursion of water. The parts in these drawings are not limited to specific male-female relationships unless so declared. In FIG. 12, angled pieces, arm-leg connectors or brackets 170 allow the installer to customize the fit of the support structure 150 to a particular truck bed 9 by minimizing the clearance between the legs 164 and the bed rails 4, 6 and adjusting how far the legs 164 descend in the bed from the lateral flanges 165 to the base 160, as well as joining the legs 164 to the base 160 to fit the width of the tailgate 8 opening, as needed.

As is clear from these drawings, a preferred embodiment uses relatively thin materials, especially in comparison to the wide space being spanned. The camper shell 102 has an outer surface 110 and inner surface 111 that define the thickness of the material that forms the camper shell 102. Similarly, the structural support 150 has an outer surface 166 and an inner surface 167 that define the thickness of the material that forms the structural support 150. The materials utilized are thin in order to reduce weight and to free space versus thicker products in the market. Reducing material also saves cost and makes the product more affordable. Materials include, but are not limited to fiberglass, aluminum sheet, and certain plastic and/or carbon composites. These products are rigid, and they flex more than standard aluminum framing. Inclusion of certain structural profiles 153 is designed to provide a maximum opening in the portal 117 and leave the interior space of the camper shell system 100 as spacious as possible.

Figure 13:
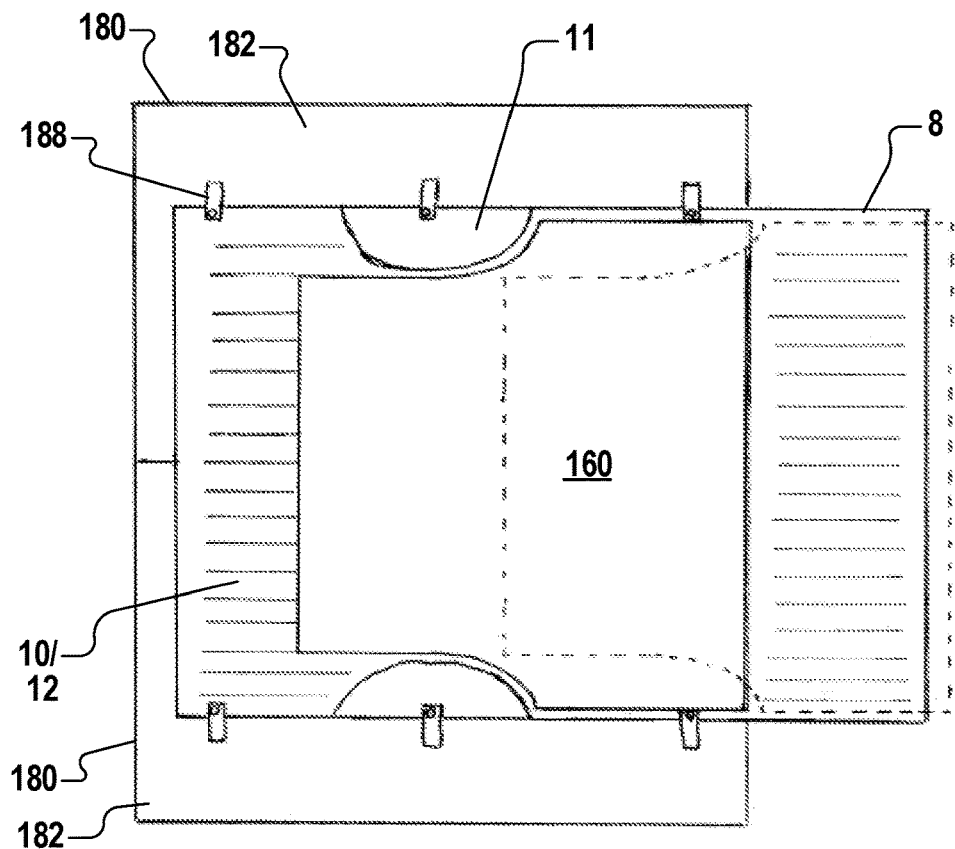
FIG. 13 is a top view of a mounting plate for a camper shell on a truck bed and a base of a structural support on the floor of the bed.
Figure 14:
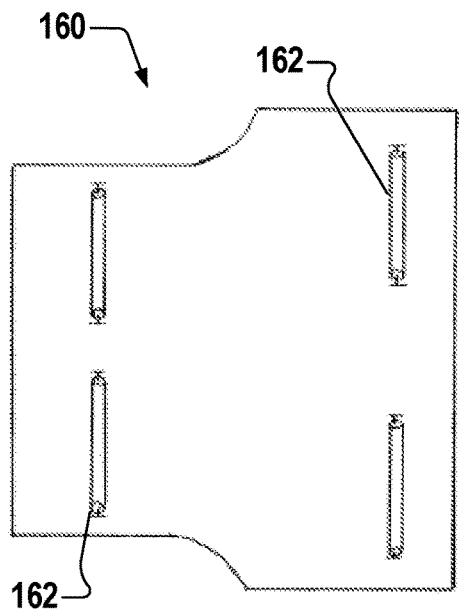
FIG. 14 is a bottom view of the base at the floor of the bed.
Figure 15:
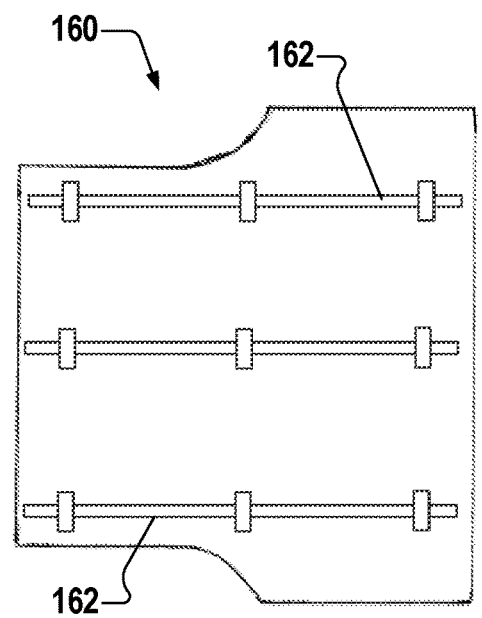
FIG. 15 is a bottom view of the base at the floor of the bed.
Figure 16:
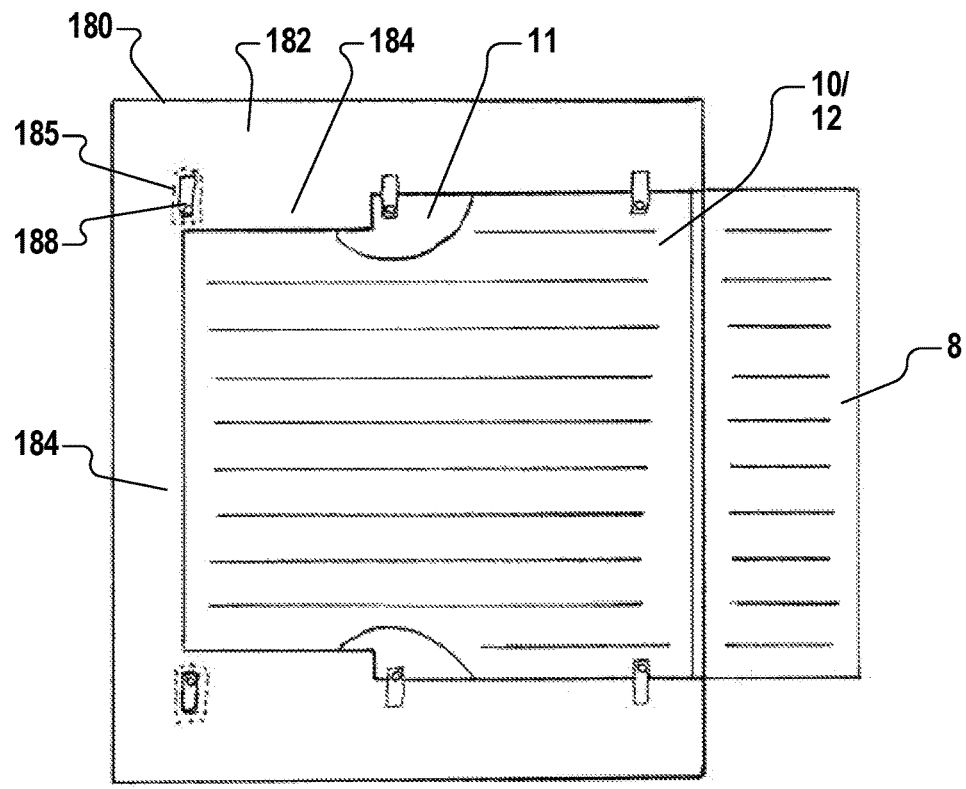
FIG. 16 is a top view of a mounting plate for a camper shell on a truck bed.
Figure 17:
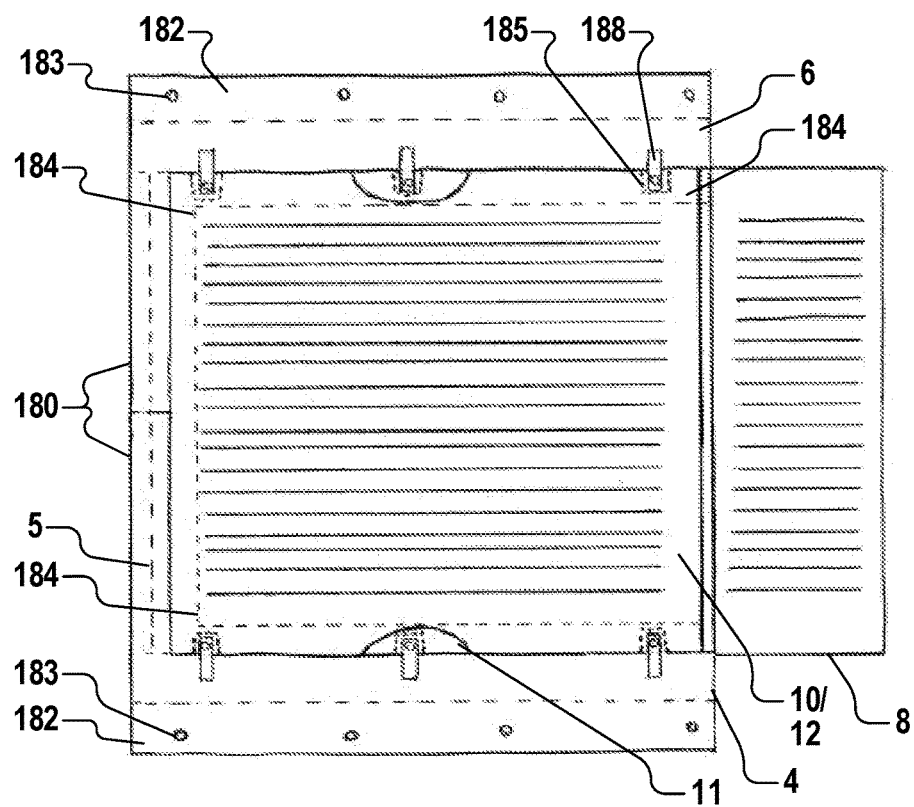
FIG. 17 is a top view of a mounting plate for a camper shell on a truck bed.

Turning now to FIGS. 13-17, the mounting plate 180 comprises one or more pieces shaped to be placed flat on top of the bed rails 4, 5, 6 and to be secured to the bed rails, typically by clamps 188. FIG. 13 is a top view that illustrates two plates 180 cut flush to the inside of the bed rails 4, 5, 6 with a wide portion 182 overhanging or extending outward beyond the bed rails. FIG. 16 is a top view of a one-piece plate 180 that has not only a wide portion 182 that extends outside of the first and second bed rails 4, 6 along their length, but also narrowing portions 184 that extend inside the first and second bed rails 4, 6 to the wheel wells and a narrowing portion 184 that extends inside the front bed rail 5 along its width. Cut-outs 185 are made in these narrowing areas 184 to allow clamps 188 to secure the plates to the rails. As discussed, the wide portions 182 join to and support the camper shell 102. The narrowing portions 184 are useful for supporting beds, other equipment, or a ladder to a covered area above the cab 2, for example. FIG. 17 is the same mounting plate 180 before any cuts are made. The narrowing portion 184 is indicated by the inner dashed line. The extent of the bed rails 4, 5, 6 are indicated by the outer dashed lines. Wide portions 182 of the mounting plates 180 reach beyond the first and second rails 4, 6 and have apertures 183 to mark a joining area for the camper shell 102. Alternatively, as stated earlier, the camper shell 102 and mounting plates 180 may be formed as one part. In a preferred embodiment, the plate(s) 180 is separate for ease of manufacturing and customization (fewer molds and universal fit), and for resale value. Instead of cutting the camper shell 102 itself, only the mounting plates 180 are cut; therefore, a different truck owner may purchase the used camper top 102 and a new plate 180 to cut to a desired fit.

Also in FIG. 13, the threshold or base 160 from a structural support 150 is illustrated in an internal or retracted position with dashed lines indicating the position to which it may slide and extend over the tailgate 8. In that extended position, the base 160, which is typically about ¾" to 1" thick and may be made of wood, but is not limited to wood, will support a ladder or ramp (not shown) from the base 160 to the ground under the truck 1. The base 160 may terminate before the wheel wells 11 or be shaped to slide deep into the bed 9 while missing the wheel wells 11, as shown. Beds 9 usually have four feet of space between wheel wells 11. Corrugation of the bed floor 10 or bed liner 21 is illustrated. FIG. 14 is a bottom view of the base 160 having a roller or slide assembly 162 that comprises large rollers that roll on top of floor corrugations. FIG. 15 is a bottom view of base 160 having a rail and small roller assembly 162 that is adjustable to roll between corrugations. No slide assembly 162 is limited to rollers, but may also use ball bearings, drawer slides, and other parts with similar functionality.

It will be understood that many modifications could be made to the embodiments disclosed herein without departing from the spirit of the invention. Having thus described exemplary embodiments of the present invention, it should be noted that the disclosures contained in the drawings are exemplary only, and that various other alternatives, adaptations, and modifications may be made within the scope of the present invention. Accordingly, the present invention is not limited to the specific embodiments illustrated herein, but is limited only by the following claims.

We claim:

1. A camper shell system for a truck having a bed with side rails and a tailgate, the camper shell system comprising:
   (a) one or more mounting plates sized to be positioned horizontally atop the length of a first bed side rail and a second side bed rail, wherein the one or more mounting plates are configured to be secured to the inside of the first and second side bed rails and to extend wider than the first and second side bed rails;
   (b) a camper shell sized to rest on the one or more mounting plates, the camper shell comprising a top, a first wall that extends downward from the top, a second wall that extends downward from the top, a front wall that extends downward from the top, and a rear portal; and (c) a structural support sized to nest within the camper shell and reinforce the first wall, top, and second wall;
   wherein the first and second walls of the camper shell extend wider than the first and second side bed rails, respectively; and
   wherein at least the first and second walls of the camper shell join to the one or more mounting plates to cover a space above and to the sides of the truck bed.

2. The camper shell system of claim 1, further comprising a liner between the structural support and the camper shell.

3. The camper shell system of claim 1, wherein the camper shell and structural support comprise one or more rigid materials that flex.

4. The camper shell system of claim 1, the structural support comprising a frame or structural profiles that make the structural support more rigid.

5. The camper shell system of claim 1, wherein the structural support further comprises a first leg and a second leg that extend from proximate the first and second side bed rails, respectively, downward within the space of the bed to join a base at the floor of the bed, wherein the structural support transfers forces acting on the camper shell to the bed of the truck.

6. The camper shell system of claim 1, wherein the structural support, when the tailgate is down, is operable to extend over the tailgate to enlarge the space covered by the camper shell system.

7. The camper shell system of claim 1, wherein the structural support, when extended over the tailgate, helps bear the top of the camper shell.

8. The camper shell system of claim 1, wherein the camper shell and one or more mounting plates are formed as one piece.

9. The camper shell system of claim 1, wherein the one or more mounting plates are structured to extend beyond the first and second side bed rails both outside of the truck and within the bed and to be cut lengthwise to fit a variety of truck bed widths.

10. The camper shell system of claim 1, wherein the mounting plates and camper shell comprise profiles that interlock to aid attachment or reduce incursion of fluids into the truck bed.

11. A camper shell system for a truck having a bed with side rails and a tailgate, the camper shell system comprising:
(a) one or more mounting plates sized to be positioned horizontally atop the length of a first bed side rail and a second side bed rail, wherein the one or more mounting plates are configured to be secured to the inside of the first and second side bed rails and to extend wider than the first and second side bed rails;
(b) a camper shell sized to rest on the one or more mounting plates, the camper shell comprising a top, a first wall that extends downward from the top, a second wall that extends downward from the top, a front wall that extends downward from the top, and a rear portal; and
(c) a structural support sized to nest within the camper shell and reinforce the first wall, top, and second wall and located proximate the rear portal, and further comprising a first leg and a second leg that extend from proximate the first and second side bed rails, respectively, downward within the space of the bed to join a base at the floor of the bed, wherein the structural support transfers forces acting on the camper shell to the bed of the truck;
wherein the first and second walls of the camper shell extend wider than the first and second side bed rails, respectively;
wherein at least the first and second walls of the camper shell join to the one or more mounting plates to cover a space above and to the sides of the truck bed;
wherein the structural support, when the tailgate is down, is operable to extend over the tailgate to enlarge the space covered by the camper shell system; and
wherein the structural support, when extended over the tailgate, helps bear the top of the camper shell.

12. The camper shell system of claim 11, further comprising a liner between the structural support and the camper shell.

13. The camper shell system of claim 11, the structural support comprising a frame or structural profiles that make the structural support more rigid.

14. The camper shell system of claim 11, wherein the camper shell and one or more mounting plates are formed as one piece.

15. An extendable shell system for a truck having a bed with side rails and a tailgate, the extendable shell system comprising:
(a) a camper shell comprising a top, a first wall that extends downward from the top and then turns horizontally inward above a first bed side rail, a second wall that extends downward from the top and then turns horizontally inward above a second bed side rail, a front wall that extends downward from the top, and a rear portal; and
(b) a structural support sized to nest within the camper shell and reinforce the first wall, top, and second wall and located proximate the rear portal, and further comprising a first leg and a second leg that extend from proximate the first and second side bed rails, respectively, downward within the space of the bed to join a base at the floor of the bed, wherein the structural support transfers forces acting on the camper shell to the bed of the truck;
wherein the first and second walls of the camper shell extend wider than the first and second bed rails, respectively;
wherein at least the first and second walls of the camper shell are configured to join to the first and second side bed rails, respectively, to cover a space above and to the sides of the truck bed;
wherein the structural support, when the tailgate is down, is operable to extend over the tailgate to enlarge the space covered by the camper shell system; and
wherein the structural support, when extended over the tailgate, helps bear the top of the camper shell.

16. The camper shell system of claim 15, further comprising a liner between the structural support and the camper shell.

17. The camper shell system of claim 15, wherein the camper shell and structural support comprise one or more rigid materials that flex.

18. The camper shell system of claim 15, the structural support comprising a frame or structural profiles that make the structural support more rigid.

19. The camper shell system of claim 15, wherein the camper shell installed on a truck extends above a cab of the truck.

20. The camper shell system of claim 1, wherein the structural support is structured to provide support from one side to an opposite side of the first wall, top, or second wall of the camper shell.

* * * * *